United States Patent [19]
Meyers

[11] 3,845,693
[45] Nov. 5, 1974

[54] POWER BRAKE BOOST MECHANISM WITH PRESSURE REGULATING DEVICE

[75] Inventor: Robert E. Meyers, South Bend, Ind.

[73] Assignee: The Bendix Corporation, South Bend, Ind.

[22] Filed: Apr. 23, 1973

[21] Appl. No.: 353,825

[52] U.S. Cl. .................. 91/371, 91/378, 60/548
[51] Int. Cl. ............................................ F15b 9/10
[58] Field of Search ............. 91/371, 372, 374, 376, 91/368, 370, 378, 431; 60/548, 552

[56] References Cited
UNITED STATES PATENTS

| | | | |
|---|---|---|---|
| 2,957,311 | 10/1960 | Stelzer | 91/376 |
| 3,050,944 | 8/1962 | Schwartz et al. | 91/431 |
| 3,148,592 | 9/1964 | Schultz et al. | 91/376 |
| 3,532,027 | 10/1970 | MacDuff | 91/372 |
| 3,707,880 | 1/1973 | Bach | 91/376 R |
| 3,712,177 | 1/1973 | Bach et al. | 91/376 R |
| 3,747,473 | 7/1973 | Bach et al. | 91/376 R |

Primary Examiner—Edgar W. Geoghegan
Assistant Examiner—A. M. Zupcic
Attorney, Agent, or Firm—Leo H. McCormick, Jr.; William N. Antonis

[57] ABSTRACT

A hydraulic power boost mechanism for a vehicle braking system includes a manually operated control valve means and a power piston sealingly positioned in a housing for reciprocal movement therein from a released position to an applied position under the influence of fluid boost pressure developed by manipulation of said valve means and acting in a chamber to which one end of the piston is exposed. Operatively connected to the boost mechanism is a pressure limiting device which is responsive to a predetermined pressure in the chamber for inhibiting further pressure rise in the chamber so that the power piston will not generate excessive pressures in the braking system via the master cylinder.

6 Claims, 2 Drawing Figures

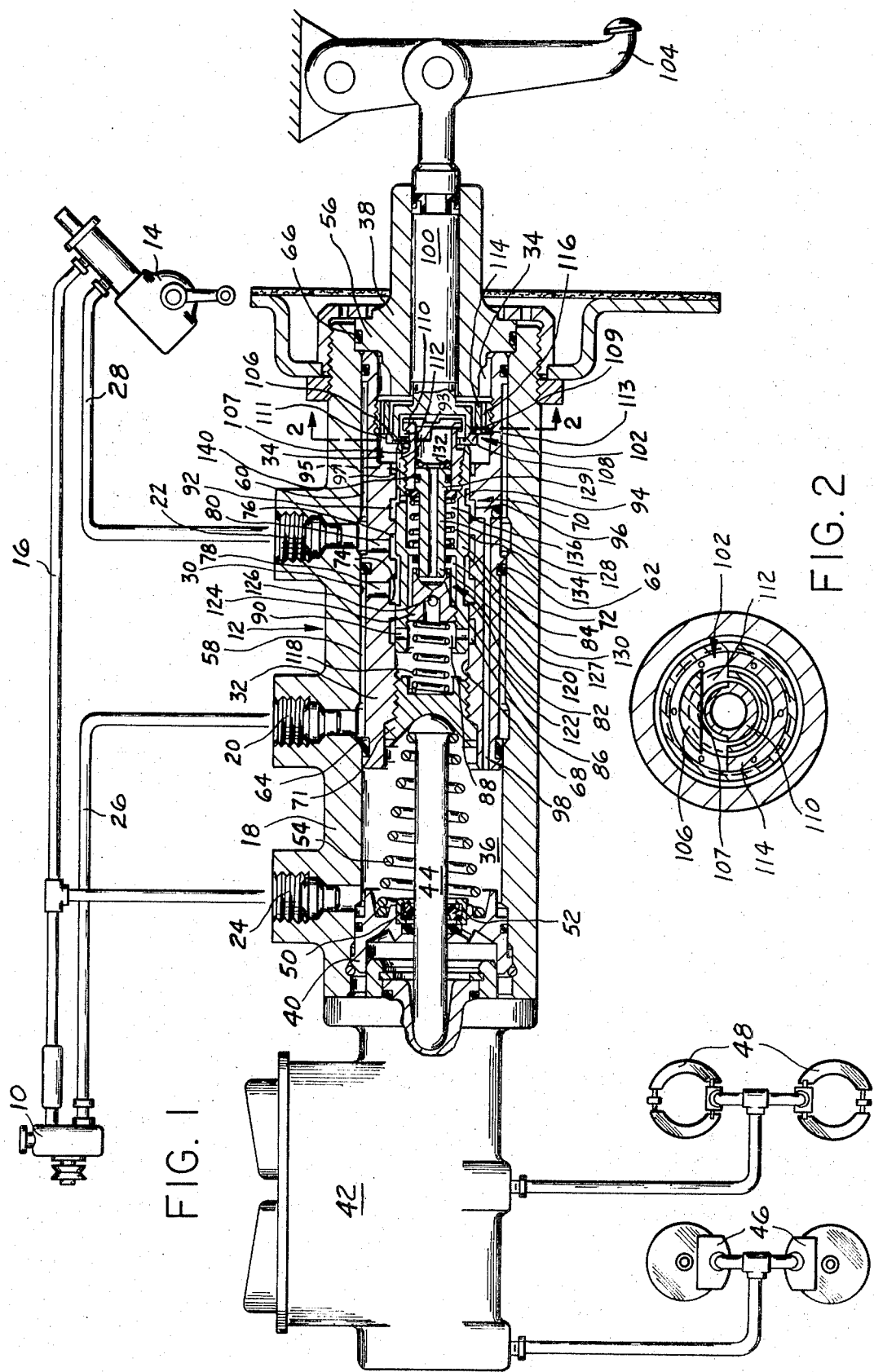

POWER BRAKE BOOST MECHANISM WITH PRESSURE REGULATING DEVICE

BACKGROUND OF THE INVENTION

The invention relates to the combination of a hydraulic power boost mechanism for a vehicle braking system and a pressure limiting device for establishing the maximum safe boost pressure the system can tolerate.

With the advent of hydraulic power boosters for vehicle braking systems the brake line pressures sometimes attained critically high values subjecting the system to failure. To cope with this problem various devices have been proposed by the prior art. One approach employs a pressure responsive member operatively connected to the power boost control valve so as to nullify further movement of the valve when a predetermined boost pressure is reached. This approach is particularly adaptable to power brake boosters having mechanical ratio changers shown and described in U.S. Pat. Nos. 3,638,427 and 3,664,130, assigned to the common assignee for this invention. The practice of nullifying control valve movement to prevent excessive line pressure build up is an acceptable expedient where a ratio changer type brake booster is used because brake pedal movement is not prevented. However, in a brake booster of the type shown and described herein, nullifying control valve movement would also nullify brake pedal movement which would in turn render the brakes inoperative. This, of course, would make the vehicle unsafe to operate. The invention overcomes this shortcoming of the prior art by connecting a hydraulic pressure responsive pressure limiting device in series flow relationship to the brake booster control valve so that the boost pressure is limited to a pre-selected value without interfering with or nullifying brake pedal operation.

SUMMARY OF THE INVENTION

It is an object of this invention to provide a hydraulic power boost mechanism for a vehicle braking system having a control valve connected in series flow relationship to a fluid pressure responsive regulating valve so that at some predetermined boost pressure the regulating valve inhibits further increase in boost pressure.

It is another object of this invention to provide a hydraulic power boost mechanism for a vehicle braking system in which the boost pressure from a control valve is sensed by a pressure regulating valve which at some predetermined boost pressure acts to prevent further boost pressure build up to thereby maintain the system pressure at a safe value.

It is a further object of this invention to provide a hydraulic power boost mechanism for a vehicle braking system in which a power piston, a spool valve and a pressure regulating valve are coaxially arranged within a housing so that movement of the spool valve from a released to an applied position develops a hydraulic boost pressure acting at one end of the piston which is sensed by the regulating valve, with the latter valve reacting to the sensed boost pressure of a predetermined value for interrupting any further development in said boost pressure.

A principal object of the invention is to provide brake line pressure limiting means for use with a hydraulic power brake boost mechanism, the brake system pressure requirements of which extend over a wide range.

DESCRIPTION OF THE DRAWING

FIG. 1 is a schematic view of a hydraulic system for a vehicle incorporating the teachings of the invention in association with a hydraulic brake boost mechanism illustrated in section.

FIG. 2 is a view in section taken on the line 2—2 of FIG. 1.

DETAILED DESCRIPTION

Referring now to FIG. 1 reference numeral 10 designates a pump which supplies hydraulic fluid to a power boost mechanism 12 and a steering gear mechanism 14 connected in series flow relationship to the return side of the pump 10 via line 16. The brake booster 12 includes a housing 18 provided with an inlet port 20, an outlet port 22 and an exhaust port 24. The inlet port 20 communicates with the outlet port of the pump 10 through conduit 26. The outlet port 22 is connected to the inlet side of the steering mechanism 14 through pipe line 28. The exhaust port 24 is communicated to the return line 16 which carries hydraulic fluid from the steering mechanism to the inlet or reservoir side of the pump 10 to complete the hydraulic circuit.

The housing 18 of the brake boost mechanism 12 is formed with a bore 30 which slidably receives a power piston 32 dividing the housing into a pressure chamber 34 and an exhaust chamber 36. An end member or fitting 38 sealingly closes the housing bore 30 adjacent the pressure chamber 34. Also a plug or fitting 40 sealingly closes the housing bore 30 adjacent the exhaust chamber 36. The piston 32 is drivably connected to a split system master cylinder 42 through a force transmitting rod 44 to apply front and rear brakes 46 and 48 respectivley. An opening 50 in the fitting 40 receives a seal 52 through which the rod 44 slidingly projects. A piston return spring 54 urges the piston 32 toward the right end of the bore so that in the brake released or power-off position the piston is in abutment with radial flange 56 of the fitting 38. The piston 32 is formed with external annular grooves 58 and 60 in its outer surface to provide continuous communication between the inlet port 20 and outlet port 22 during piston movement to the left as the brakes are applied. A seal 62 prevents leakage between the grooves 58 and 60. Seal 64 prevents leakage between the grooves 58 and the chamber 36 and seal 66 prevents leakage between the groove 60 and the chamber 34. The piston 32 is further provided with a longitudinal bore 68 which houses control valve means 70 having a spool valve 72 slidably disposed in the bore for controlling the boost pressure in the power chamber 34. The bore 68 is closed at one end by a threaded plug 71 against which the rod 44 drivably abuts. The longitudinal bore 68 is formed with internal annular recesses 74 and 76. A radial passage 78 connects the recess 74 with the groove 58 and a radial passage 80 connects the recess 76 with the groove 60. In the released position of the control valve 70, as shown in FIG. 1, communication between the inlet port 20 and the outlet port 22 is through an annular recess 82 in the spool valve member 72. In this position of the spool valve the recess 82 overlaps the recesses 74 and 76. Recess 82 is chamfered at 84 so that flow to the steering gear cannot be cut off completely during braking. Annular channel or recess 86 in the piston bore 68 is communicated to a central cavity or passage 88 through radial passages 90 in the spool valve. Annular recess 92 is located in the piston bore 68 so as to overlap annular recess 94 in the spool valve when the control valve is in released position, as shown, so that the boost pressure in the chamber 34 is communicated to exhaust 24 by flowing through channel 95 in the spool valve to radial passage 96 and passageway 98.

The spool valve 72 is operatively connected or joined to a thrust plunger 100 through a T-slot connection 102. A foot pedal 104 is pivotally carried on the exterior end of the thrust rod 100. The T-slot connection 102, which establishes communication between the central cavity 88 of the spool valve and the power chamber 34, includes opposed flanges 106 and 108 having inwardly projecting portions 107 and 109, respectively, overlaying a collar 110 carried on the right end of the spool valve 72 to thereby lock the thrust rod 100 to the spool valve. The opposed flanges 106 and 108 form a space 112 communicating the central cavity or passage 88 of the spool valve with the power chamber 34. The flanges 106 and 108 also extend radially outwardly, forming abutments 111 and 113 respectively, which engage a ring 114 threadably attached to the piston 32 for positioning the valve spool 72 in the released position within the bore 68 of the piston. Passages 116 in the ring 114 maintain communication with the end of the piston 32 exposed to the power chamber 34. A return spring 118, located in the spool valve central cavity 88, urges the spool to its released position, in which the abutments 111 and 113 engage the ring 114.

The control valve means 70 is the primary control for the brake boost mechanism 12. However, as aforementioned, the brake system pressure developed by manipulation of the control valve can attain values approaching brake line burst pressure. Therefore, the improvement as hereinafter set forth concerns a pressure regulating or limiting device 120 which is responsive to a predetermined pressure in the boost chamber 34 for preventing further pressure rise above a given value so that the brake line pressures developed through the master cylinder 42 are held within prescribed safe limits. The pressure regulating device or valve 120 is positioned in the central cavity 88 of the spool valve 72 and includes a seat 122 located in an axially adjustable member 124 threadedly mounted in the central cavity of the spool. A passage 126 communicates the opposite ends of the adjustable member 124. The regulating valve is further provided with a stepped diameter hollow plunger 128 slidably positioned in the spool valve central cavity for seating on the seat 122. The stepped diameter plunger has its smaller end 127 terminating in cavity 120 with which the passage 126 communicates. A retainer ring 132 positions the larger end 129 of the plunger 128 in the spool central cavity so as to limit plunger movement to the right. A spring 134 urges the larger diameter end of the plunger against the retainer ring 132. The spring 134 is located in a concentric cavity 136 which communicates with the annular recess 92, the latter of which is open to the exhaust port 24. Seals 138 and 140, located at the smaller end 127 and larger end 129 respectively of the stepped plunger 128, prevent leakage into the concentric cavity 136. The spacing between the smaller end 127 of the plunger 128 and the seat 122 may be varied by adjusting the member 124, thus changing the boost pressure in power chamber 34 required to seat the plunger 128.

MODE OF OPERATION

Assuming the pump 10 is in operation and the brake pedal 104 is released, the relationship between the power piston 32, control valve means 70 and the regulating valve 120 is as illustrated in the drawing, at which time hydraulic fluid flows into inlet port 20, groove 58, radial passage 78, recesses 74, 82 and 76, radial passage 80, groove 60 and outlet port 22 from which the fluid returns to the pump 10 via the steering gear mechanism 14. In this released position of the pedal 104, the pressure chamber 34 is communicated to the exhaust port 24 through channels 95, recesses 94 and 92, radial passage 96, passageway 98, and exhaust chamber 36. Rotating the pedal 104 from the released position, as shown in FIG. 1, moves the spool valve 72 to the left, will close the channel 95 which communicates the pressure chamber 34 with the exhaust port when shoulder 93 engages land 97, and will open the pressure chamber to the inlet port 20 through the T-slot connection, central cavity 88 of the spool valve, and the various passages including the annular recesses 86 and 82. As the foot pedal 104 is further depressed to the left, the spool valve 72 is opened wider, admitting more hydraulic fluid to the pressure chamber 34 until the boost pressure acting in the chamber 34 and on the ends of the stepped diameter plunger attains a predetermined value the net force of which overcomes the spring 134, causing the plunger to shift toward the seat 122, thus restricting further boost pressure build up. Upon engagement between the seat 122 and plunger 128, further pedal movement will only shift the spool valve 72 to the left increasing the pressure in the left end of the cavity 88 adjacent the plug 71. This will have no effect on the pressure in the chamber 34 since the plunger end 127 is on the seat 122. Of course, this increase in pressure in the left end of the cavity 88 will mean a stiffer pedal due to the hydraulic reaction on the inner end of the spool valve. The predetermined boost pressure acting in the chamber 34 may be preselected by adjusting the seat 122 with respect to the end 127 of the hollow plunger 128. In this manner the boost pressure acting in the chamber 34 may be selectively limited to a value which will keep the master cylinder line pressure within an acceptable range below brake line burst pressure.

I claim:

1. In a hydraulic power boost mechanism for a vehicle braking system having a housing with a piston reciprocally positioned therein dividing the housing into an exhaust chamber and a pressure chamber, said piston being provided with a longitudinal bore and control valve means in the bore including a spool valve having a released position in which the pressure chamber is communicated to the exhaust chamber and an applied position in which the pressure chamber is connected by a central passage to a hydraulic fluid pressure source for developing a boost pressure in the pressure chamber for driving the piston, the improvement which comprises:

a pressure limiting device having a seat in the central passage of the spool valve, and a hollow plunger in the central passage normally unseated from the seat to allow communication with the pressure chamber, said plunger having opposed stepped ends of smaller and larger diameters exposed to the pressure chamber and responsive to the boost pressure in the chamber at a predetermined value for urging the plunger against the seat to inhibit further rise in boost pressure so that the pressure attained in the braking system is held within prescribed limits.

2. The improvement in claim 1 wherein said pressure limiting device further includes a spring urging the plunger off the seat to permit fluid pressure to communicate with the pressure chamber through the hollow plunger, said hollow plunger being acted upon by the boost pressure of said predetermined value to urge the plunger toward the seat to restrict fluid pressure communication with the pressure chamber.

3. The improvement in claim 1 wherein said hollow plunger further includes ends of differential areas exposed to the pressure chamber boost pressure with the net effective force acting on the ends of the plunger in a direction opposite to the spring force.

4. The improvement in claim 3 wherein said seat is located adjacent the plunger end having the smaller of the differential areas, said seat being adjustable with respect to the end having the smaller of the differential areas to permit selecting the desired boost pressure at which the pressure chamber is closed to further pressure rise.

5. The improvement in claim 1 wherein the pressure limiting device, the spool valve and the piston are concentrically carried within the housing;

and a foot pedal operated thrust rod operatively connected coaxially to the spool valve for moving the spool valve from its released position to its applied position.

6. The improvement in claim 1 wherein said seat is adjustably located in the central passage so that the boost pressure may be changed as desired to meet the braking system requirements.

* * * * *